(No Model.) 2 Sheets—Sheet 1.
J. VILLARD & J. P. HENDERSON.
MATCH SAFE.
No. 603,301. Patented May 3, 1898.
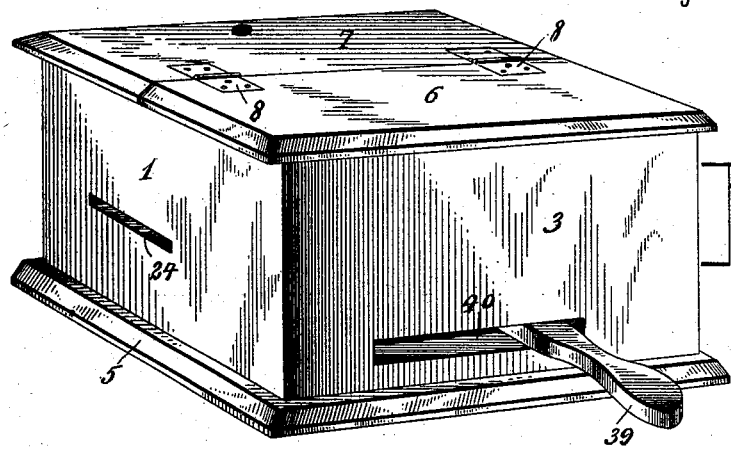
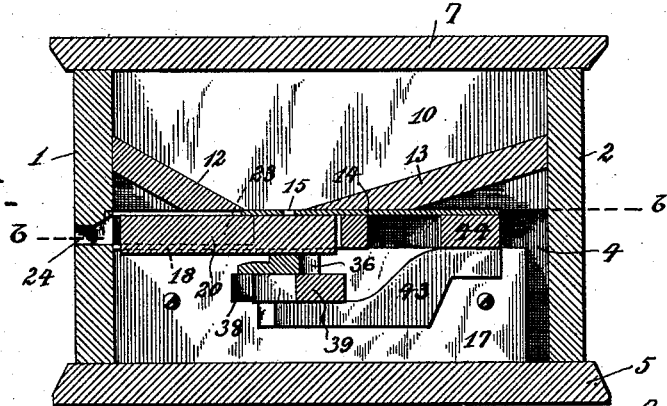
Witnesses
John F. Leutheriol
Edwin Cruse
Inventors
John Villard
Jas. P. Henderson
By their Attorneys,
C. A. Snow & Co.

(No Model.) 2 Sheets—Sheet 2.
J. VILLARD & J. P. HENDERSON.
MATCH SAFE.
No. 603,301. Patented May 3, 1898.
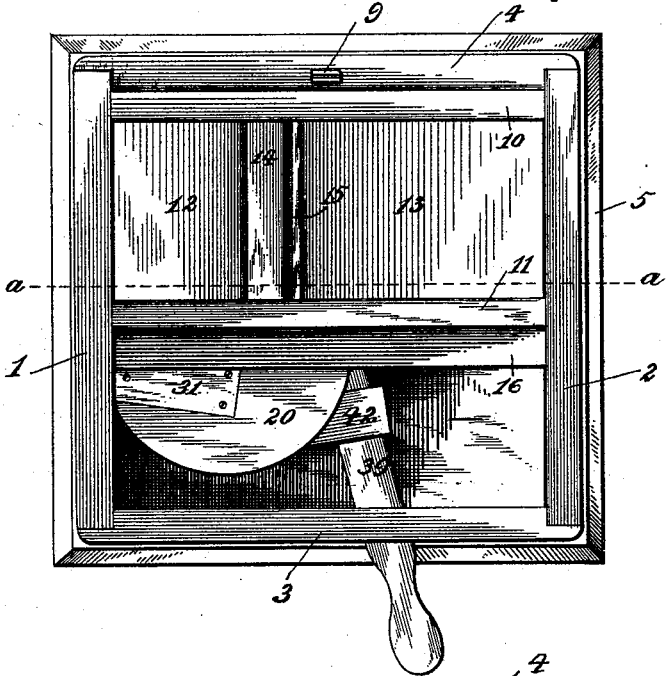
FIG. 2.
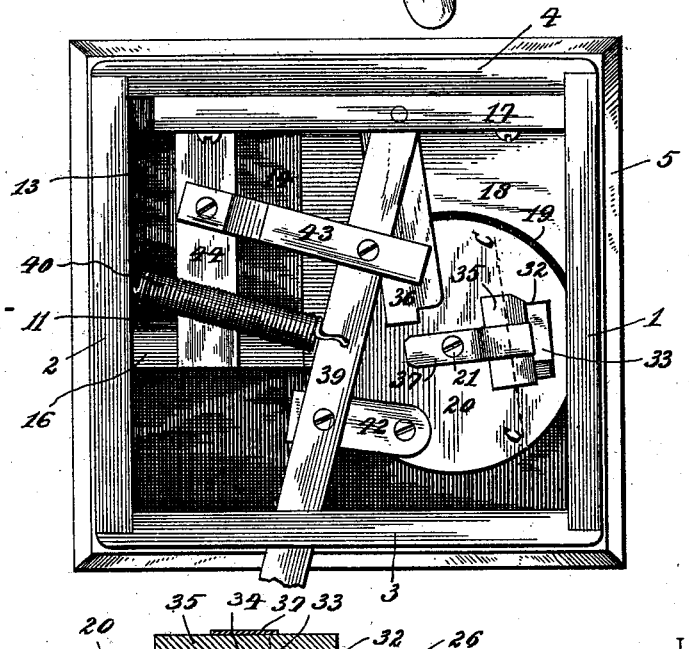
FIG. 3.
FIG. 6.
Witnesses
John F. Deufferwiel
Edwin Cruse
Inventors
John Villard
Jas. P. Henderson
By their Attorneys,
C. A. Snow & Co.
THE NORRIS PETERS CO., PHOTO-LITHO., WASHINGTON, D. C.

UNITED STATES PATENT OFFICE.

JOHN VILLARD AND JAMES POTTS HENDERSON, OF BONHAM, TEXAS.

MATCH-SAFE.

SPECIFICATION forming part of Letters Patent No. 603,301, dated May 3, 1898.

Application filed October 18, 1897. Serial No. 655,605. (No model.)

*To all whom it may concern:*

Be it known that we, JOHN VILLARD and JAMES POTTS HENDERSON, citizens of the United States, residing at Bonham, in the county of Fannin and State of Texas, have invented a new and useful Match-Safe, of which the following is a specification.

This invention relates to match-safes, its object being to provide a simple and efficient device of this character adapted to deliver the matches singly to a suitable aperture through which they may be withdrawn and ignited during the withdrawal.

With this object in view the invention consists of the several details of construction and combination of parts, as will be hereinafter fully described, and particularly pointed out in the claims.

In the drawings, Figure 1 is a perspective view of the match-safe. Fig. 2 is a top plan view of the interior of the same. Fig. 3 is a bottom plan view of the interior of the same. Fig. 4 is a vertical section on the line $a\,a$ of Fig. 2. Fig. 5 is a horizontal section on the line $b\,b$ of Fig. 4. Fig. 6 is a sectional view of the delivering-disk on the line $c\,c$ of Fig. 3.

Similar reference-numerals indicate similar parts in the several figures.

The safe is preferably rectangular in form, and the sides thereof are indicated by 1, 2, 3, and 4, respectively. The side marked 1 for the sake of distinction will be considered the front of the safe. The bottom 5 may be secured to the sides in any suitable manner, and preferably the top 6 will be formed in two sections indicated by 6 and 7, the former being secured to the sides in any suitable manner and the latter being hinged or otherwise removably connected to the section 6, as indicated at 8, and secured in position by a T-headed locking-screw 9, which is adapted to turn across a slot formed in the edge of the movable section 7.

The match-holding compartment consists of the sides 10 and 11 and of a bottom formed of inclined sections, indicated, respectively, by 12 and 13, the former being shorter than the latter and the two sections being so arranged that a space is left between their lower ends. This match-holding compartment will occupy substantially one-fourth of the interior space of the safe, and the side 10 thereof will abut against the inner face of the side 4 of the safe. The bottom sections will be secured to the sides in any suitable manner, and the sides will be secured to the safe in any suitable manner.

14 indicates the match-carrying plate, which is adapted to slide below the match-holding compartment, and this plate is provided with a slot 15 of such dimensions as to receive a single match. The plate 14 engages the lower edges of the sides 10 and 11 of the match-holding compartment, and one of its side edges abuts against the inner face 4 of the safe and its opposite edge against the inner face of a bar 16, which is secured to the outer face of the side piece 11 of the match-holding compartment and projects beyond the lower edge of the side 11 a distance equal to the thickness of the plate 14. A bar 17 is secured to the inner face of the sides 4 of the safe, with the lower edges flush with each other, and to the upper edge of this bar a plate 18 is secured, which plate serves as a partial support for the sliding plate 14. The plate 18 is provided with a semicircular cut-out 19 to form a seat, in which the match-delivery disk 20 may turn. This disk is centrally pivoted on a screw 21, which is secured in the bar 16, and when the disk is in position it will, together with the plate 18, support the plate 14, which will be free to slide between them and the bottom of the match-holding compartment. A concaved recess 22 is formed in the inner face of the side 1 of the safe, in which the disk 20 projects and which forms a continuation of the semicircular cut-out in the plate 18. The front portion of the plate 18 is also cut away in a horizontal plane to form a recess 23 below the sliding plate 14 for the purpose of affording space for the match to move in when the disk turns on its pivot for the purpose of presenting one end of the match through the slot 24, which is formed in the front side 1 of the safe and which communicates with said recess 23.

The disk 20 is provided on its upper face with a narrow recess 25, extending from its periphery to nearly its center, and to one side of this recess a strip of metal 28, having a roughened surface, is secured, and this side of the recess 25 will form a fixed jaw. The recess 25 is provided with a lateral extension 26, leading from the side opposite to that to which the strip 28 is secured, and this lateral extension forms a seat for a movable jaw 27, which is adapted to coöperate with the fixed jaw to grasp the headed end of a match. This movable jaw is also provided with a roughened strip of metal (indicated by 29) to coöperate with the strip 28 for the purpose of igniting the match when it is withdrawn from between the jaws, as will be more specifically referred to hereinafter.

30 indicates a coiled spring which is seated between the inner edge of the jaw 27 and the opposing wall of the recess 26. A metal plate 31 is secured to the disk to hold the jaw in its seat, and this plate is let into the disk to be flush with the face thereof.

In the lower face of the disk a rectangular recess 32 is formed, extending an equal distance to each side of the narrow recess 25, with which it communicates, and also with the lateral extension 26. A block 33, of less width than the recess 32, is seated in said recess to be flush with the face of the disk, and this block is secured to the movable jaw 27 by screws 34 or similar securing devices.

35 is a short bar engaging the face of the disk and extending across the recess 32, and this bar is connected to the jaw 27 and block 33 by the screws 34. Normally the jaw 27 will be held by the spring 30 in engagement with the fixed jaw; but when the disk 20 is turned on its pivot the bar 35 will be caused to engage a stop 36 and move the jaw 27 away from the fixed jaw sufficiently to permit the headed end of a match to drop between them. A strip of metal 37 is secured to the disk to project across the bar 35 to hold the latter in engagement with the disk 20 in order to prevent the movable jaw from tilting sidewise and thereby binding in its bearings. The stop 36 is secured to the plate 18 and projects across the disk into the path of travel of the short bar 35.

The bar 17 is provided with a recess 38, in which one end of a lever 39 is pivoted, and the other end of this lever projects through a slot 40 in the side 3 of the case. A coiled spring 41 is secured at one end to the side 2 of the casing and at its other end to the lever 39, substantially midway its length.

42 indicates a link which is pivotally connected at one end to the disk 20 and at its other end to the lever 39. Another link 43 is pivotally connected at one end to the lever 39 and at its other end to a bar 44, which is secured to the rear end of the plate 14.

The device will operate in the following manner: Normally the lever 39, disk 20, and sliding plate 14 will occupy the position shown in Figs. 2 and 3, and a match will be supported in the slot 15 by the disk 20 and the plate 18. If now the lever 39 be moved to the position indicated in dotted lines in Figs. 1 and 3, the disk will be rotated and the sliding plate 14 moved forwardly until the slot 15 will be in alinement with the narrow recess 25 in the disk, and the bar 35 will be engaged with the rear stop 36 and thereby move the jaw 27 away from the fixed jaw sufficiently to permit the headed end of the match to drop between them, and the match will project from the disk into the recess 23. As soon as the lever is released the coiled spring 41 will retract it and thereby rotate the disk in the opposite direction, and the match will be carried around by the disk and projected through the slot 24 in the front side of the safe, when it may be grasped and withdrawn between the jaws in the disk. During the withdrawal the roughened strips of metal 28 and 29 will ignite the match, since they will be forced toward each other with considerable pressure by the spring 30. As soon as the spring 41 has retracted the lever 39 the sliding plate 14 will also have been returned into position to receive another match.

It will be understood that changes in the form, proportion, and the minor details of construction may be resorted to without departing from the spirit or sacrificing any of the advantages of this invention.

Having thus described the invention, what we claim is—

1. In a match-safe, the combination with an outer casing provided with a match-delivery slot in one of its sides, of a match-holding compartment within the casing, a slotted sliding plate to receive matches singly from the said compartment, a pivoted disk to receive the match from the plate and carry it to said slot, and means to reciprocate the sliding plate, and to turn the disk on its pivot, substantially as described.

2. In a match-safe, the combination with the outer casing provided with a match-delivery slot in one of its sides, of a match-holding compartment within the casing having a bottom formed of inclined sections with a space between their lower ends, a slotted plate supported to slide below the said compartment and to receive the matches singly therefrom in its slot, a pivoted disk to receive the match from the plate and carry it to said delivery-slot, and means to reciprocate the sliding plate and to turn the disk on its pivot, substantially as described.

3. In a match-safe having a delivery-slot in its side, the combination with a match-holding compartment having an opening in its bottom and a sliding plate having a slot to receive the matches singly from said compartment, of a pivoted disk having a fixed jaw and a movable jaw, means to rotate the disk and move the sliding plate to cause the slot in the latter to register with the said jaws and deliver the match between them, devices to actuate the movable jaw, and means to rotate the disk to present the match in the delivery-slot, substantially as described.

4. In a match-safe having a delivery-slot in its side, the combination with a match-holding compartment having an opening in its bottom, and a sliding plate having a slot to receive the matches singly from said compartment, of a pivoted disk having a fixed jaw and a spring-actuated movable jaw, a bar connected to the said movable jaw, means to rotate the disk and move the sliding plate to cause the slot in the latter to register with the said jaws, a stop to engage the bar on the movable jaw to separate the latter from the fixed jaw, to permit the match to fall from the slot between the jaws, and means to rotate the disk to present the match in the delivery-slot, substantially as described.

5. In a match-safe having a delivery-slot in one of its sides, the combination with a match-holding compartment, having an opening in its bottom and a sliding plate having a slot to receive the matches singly from said compartment, of a pivoted disk to receive the match from the plate and carry it to said slot, a lever pivoted within the safe and projecting through a slot in one of its sides, links pivoted to the lever and to the disk and sliding plates respectively, and a spring connected to the lever and safe to move the lever in one direction, substantially as described.

6. In a match-safe having a delivery-slot in one of its sides, the combination with a match-holding compartment having an opening in its bottom and a sliding plate having a slot to receive the matches singly from the said compartment, of a pivoted disk having a fixed jaw and a spring-actuated movable jaw, the opposing faces of said jaws being roughened, means to rotate the disk and move the sliding plate to cause the slot in the plate to register with said jaws and deliver the match between them, and means to rotate the disk and cause it to present the match in the delivery-slot, from which it may be withdrawn from between the roughened jaws and ignited during the withdrawal, substantially as described.

In testimony that we claim the foregoing as our own we have hereto affixed our signatures in the presence of two witnesses.

JOHN VILLARD.
JAMES POTTS HENDERSON.

Witnesses:
J. W. SOWELL,
M. BROWN.